Jan. 31, 1961 L. A. RUNTON ET AL 2,969,997
PACKING RING
Filed Oct. 20, 1958 2 Sheets-Sheet 1
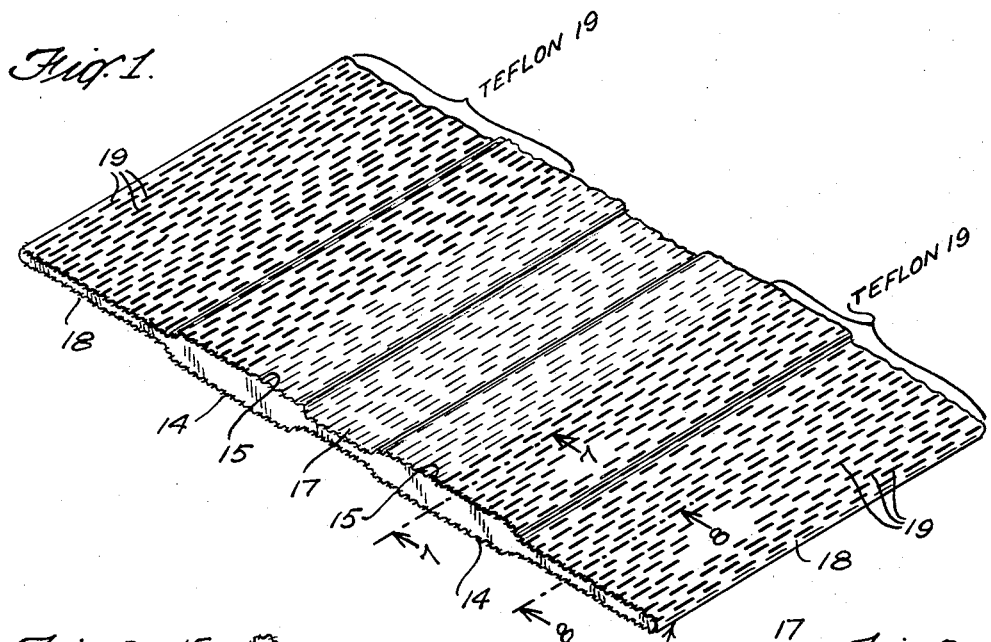
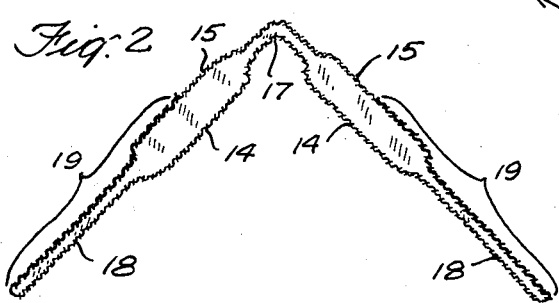
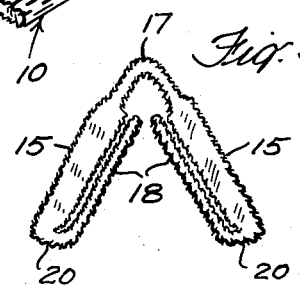
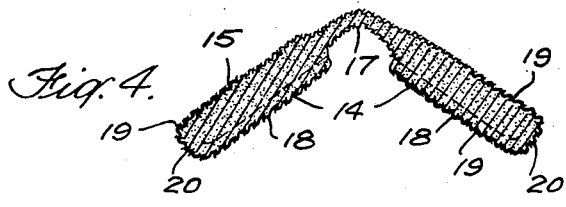
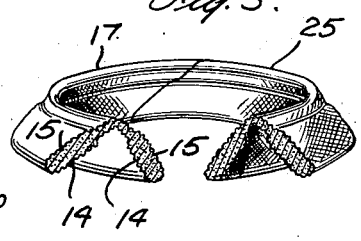
INVENTORS
LESLIE A. RUNTON
HENRY C. MORTON
BY
ATTORNEY Jan. 31, 1961 L. A. RUNTON ET AL 2,969,997
PACKING RING
Filed Oct. 20, 1958 2 Sheets-Sheet 2
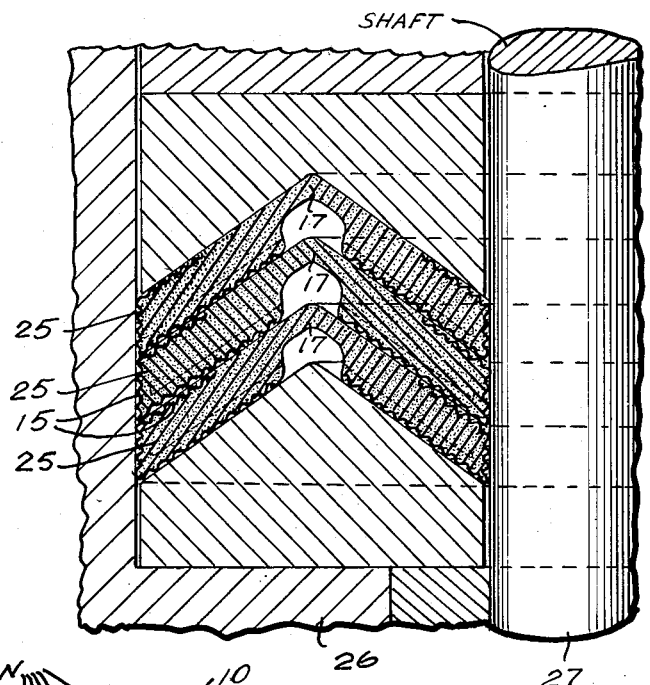
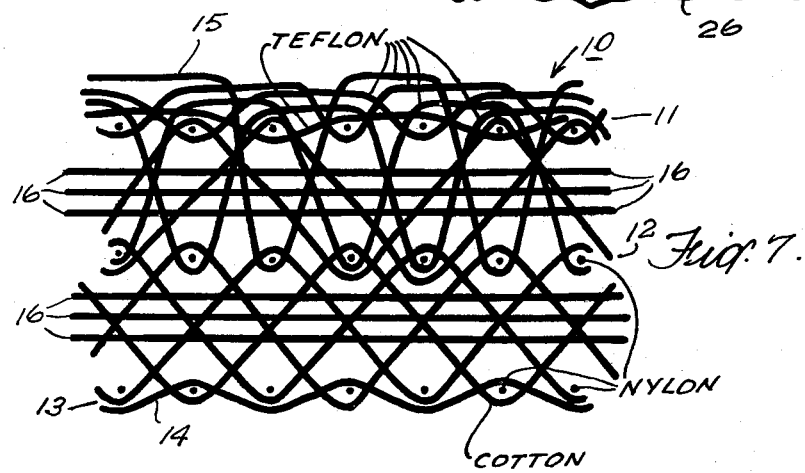
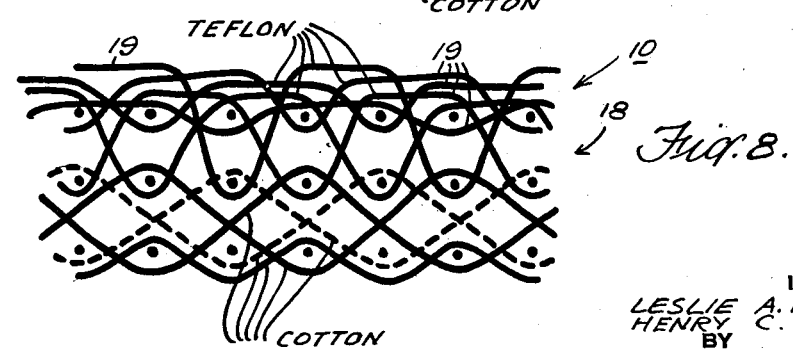
INVENTORS
LESLIE A. RUNTON
HENRY C. MORTON
BY
ATTORNEY

2,969,997
PACKING RING

Leslie A. Runton, Middle Haddam, and Henry C. Morton, Branford, Conn., assignors to The Russell Manufacturing Company, Middletown, Conn., a corporation of Connecticut Filed Oct. 20, 1958, Ser. No. 768,100
2 Claims. (Cl. 288—17)

This invention relates to packing rings for pump shafts and the like and more particularly to packing rings which are self-adjusting in response to the liquid pressure to which they are subjected.

An object is to provide a packing ring having novel and improved characteristics.

Another object is to provide a packing ring having antifriction properties.

Another object is to provide a novel and improved fabric strip for making the packing ring.

Another object is to provide a novel and improved method for making a packing ring of the above type.

Other objects and advantages will be apparent as the nature of the invention is more fully disclosed.

In accordance with the present invention the packing ring is made from a woven one piece fabric strip having longitudinal ribs of increased thickness formed on opposite sides of the center and having side flaps to be folded inward over said ribs. The outer surface of these side flaps is composed of Teflon yarn so disposed that the Teflon yarn forms the entire under surface of the folded ring and covers the outer edges which contact with the housing wall and with the shaft.

The strip is impregnated with a suitable rubber bonding material (such as neoprene) and formed into a ring of the desired cross section.

When such rings are stacked, the contacting surfaces are composed of Teflon which has an extremely low coefficient of friction and offers a negligible resistance to the slippage required to allow the rings to open due to the pressure exerted by the liquid and to maintain a tight seal with the moving shaft. The Teflon surface in contact with the shaft reduces wear on the shaft and increases the life of the rings.

The nature of the invention will be better understood by referring to the accompanying drawings, taken in connection with the following description in which a specific embodiment has been set forth for purposes of illustration.

In the drawings:

Fig. 1 is a perspective view of a fabric strip from which the packing ring is molded;

Fig. 2 is an end elevation of the fabric strip of Fig. 1 folded along its center line.

Fig. 3 is a view similar to Fig. 2 with the side flaps folded in to provide a Teflon contacting surface;

Fig. 4 is a section through the molded packing ring;

Fig. 5 is a broken perspective view of the molded packing ring;

Fig. 6 is an enlarged fragmentary section showing a series of stacked rings in a packing gland; and Figs. 7 and 8 are warpwise sections taken on the lines 7—7 and 8—8 of Fig. 1 illustrating the weaves.

Referring to the drawings more in detail the invention is shown as embodied in a woven strip 10 woven from yarns of a rubber or resin bondable material such as cotton or Dacron and formed of a plurality of plies, shown in Fig. 7 as plies 11, 12 and 13, which are bound together by binder yarns in the usual manner. Ribs 14 and 15 are formed on the under surface of the strip 10 on opposite sides of the longitudinal center line by means of stuffer yarns 16. The ribs 14 and 15 are separated by a center panel 17. Side flaps 18 extend beyond the ribs 14 and 15 on each side edge of the strip.

The upper surface of the flaps 18 and at least a portion of the upper surface of the strip above the ribs 14 and 15 is formed of Teflon warp yarns 19 which are disposed in the upper ply 11 and are bound by the usual chain yarns to be exposed at the surface to form an antifriction contacting surface.

The fabric strip 10 is folded about its center line into V shape as shown in Fig. 2 and the side flaps 18 are folded inwardly as shown in Fig. 3, so that the Teflon yarn is exposed at the side edges 20 and forms substantially the entire under surface of the folded strip.

The strip is impregnated with a bonding impregnant such as natural or synthetic rubber, for example, neoprene in a hydrocarbon solvent or Viton, a high temperature synthetic rubber sold by Du Pont, or other latices or a resin such as a phenolic resin, an epoxy resin, an aqueous dispersion of Teflon, or graphite and oil.

After impregnating the impregnant is dried but not cured, and the strip folded into V shape as shown in Fig. 3 to form a rope or ribbon which is wound on a reel for shipment or for subsequent use.

For making the packing rings the required length of the impregnated ribbon is cut from the reel, preferably by a bias cut as shown in Fig. 5 and is placed in a mold, pressed into the form of a ring of the desired size and vulcanized or cured by suitable heat to form an annular packing ring 25 of V-shaped cross section in which the edges and the under surface are composed of Teflon. The yarn in this case is embedded in the impregnant which is now in a heat set cured state and forms a relatively stiff product. If Teflon is used as the impregnant the Teflon resin coats the bondable yarn and forms in effect a complete Teflon surface for the V ring. A stack of such rings 25 is placed in a packing gland 26 around a shaft 27 which is to be sealed with the inside of the V rings toward the high pressure side of the gland.

In use the fluid pressure expands the rings into sealing engagement with the shaft 27. The Teflon contacting surfaces permit the rings to deform and slide over the contacting ring surfaces freely. The Teflon surface of the fabric extending around the edges of the rings eliminates wear on the shaft and also eliminates the necessity for lubricants which might contaminate the fluids.

Obviously in certain instances the impregnant may be omitted and the untreated fabric formed directly into V rings as above described.

Although a specific embodiment has been shown it is to be understood that the invention may be applied to various uses and that changes and adaptations may be made therein as will be apparent to a person skilled in the art.

What is claimed is:

1. A one piece molded fabric packing ring comprising a woven fabric impregnated with a molding compound in cured state, said ring being V shaped in cross section, said fabric comprising a plurality of plies and having edge flaps folded inwardly to form the under contacting surface of said ring, the exposed surface of said folded flaps and the exposed edges thereof being composed of Teflon yarn, the remainder of said fabric being composed of a yarn which is bondable to said impregnating compound.

2. A molded fabric packing ring comprising a fabric strip having a pair of longitudinal ribs disposed on one side thereof and spaced to form a center panel therebetween with side flaps beyond the ribs, said side flaps being folded inwardly over said ribs to form the under surface of said ring, said fabric being folded along said center panel into V-shaped cross section, at least the exposed surfaces of said folded flaps being composed of Teflon yarn, said yarn extending around the folded side edges, bondable yarns binding said Teflon yarns to said fabric and a bonding impregnant in cured state impregnating said fabric.

References Cited in the file of this patent

UNITED STATES PATENTS

| | | |
|---|---|---|
| 1,076,119 | Hirschfeld | Oct. 21, 1913 |
| 1,712,003 | Hubbard | May 7, 1929 |
| 2,706,655 | Showalter | Apr. 19, 1955 |
| 2,804,886 | White | Sept. 3, 1957 |
| 2,841,429 | McCuistion | July 1, 1958 |
| 2,892,650 | Runton | June 30, 1959 |